Figure 1:
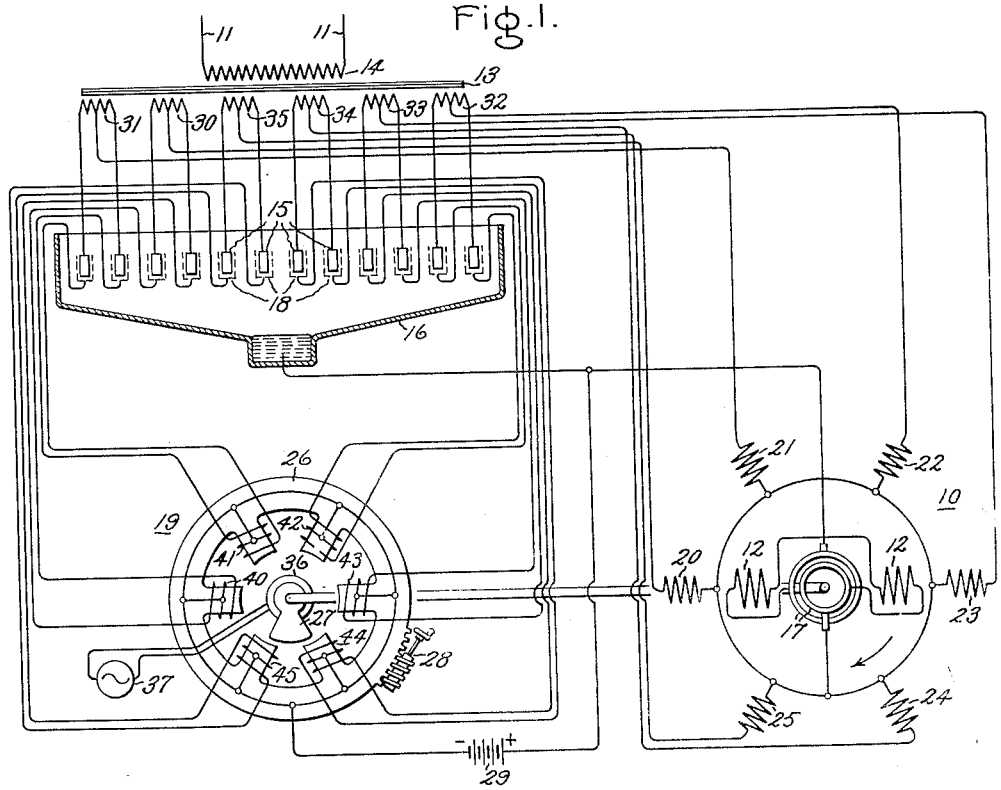

Inventor:
Christian Kramer,
by Charles E. Mulla
His Attorney.

Patented Aug. 21, 1934

1,971,188

UNITED STATES PATENT OFFICE

1,971,188

GRID-CONTROLLED ELECTRIC VALVE CONVERTING SYSTEM

Christian Krämer, Berlin-Pankow, Germany, assignor to General Electric Company, a corporation of New York Application June 9, 1933, Serial No. 675,036
In Germany September 3, 1932

10 Claims. (Cl. 172—120)

My invention relates to grid-controlled electric valve converting systems and more particularly to a new and improved apparatus for supplying grid excitation to the valves of the converting apparatus.

There have been devised a number of electric valve converting systems for transmitting energy from a direct or alternating current supply circuit to a variable frequency alternating current load circuit or variable speed alternating current motor. In such systems it is necessary to excite the grids of the electric valves with a periodic potential of a frequency equal to that of the load circuit or corresponding to that of the speed of rotation of the motor. It is not ordinarily possible to derive this grid excitation directly from the load circuit, if it is not connected to an independent source of electromotive force, or from the alternating current circuit of the motor, because of the fact that, at very low frequencies the magnitude of this excitation potential is insufficient. Moreover, in case it is desired to initiate the energization of the load circuit at zero frequency, corresponding to the position of rest for a motor, no control voltage is available from this source. Heretofore, such excitation has, therefore, been derived from an auxiliary source of current and a distributor or commutator driven at a speed corresponding to the frequency which it is desired to supply the load circuit, as for example, by connecting it directly to the motor shaft, in case of a motor load, or to an auxiliary synchronous motor, in the case of a general alternating current load circuit. Such mechanical commutators or distributors have well known and inherent disadvantages even when applied to systems requiring relatively small amounts of current, as in the case of grid excitation systems.

It is an object of my invention, therefore, to provide a new and improved grid excitation apparatus for an electric valve converting system which will overcome the above mentioned disadvantages of the arrangements of the prior art and which will be simple and reliable in operation.

It is another object of my invention to provide an improved excitation apparatus for an electric valve converting system which will eliminate the use of any mechanical contact apparatus, such as mechanical commutators or distributors.

It is a further object of my invention to provide an improved grid excitation apparatus for an electric valve converting system in which the magnitude and essential characteristics of the grid excitation of the electric valves is substantially independent of the frequency at which the system is operating.

In accordance with one embodiment of my invention, I provide an electric valve converting system with a grid excitation apparatus comprising a magnetic core member provided with a plurality of induced windings for connection to the grids of the electric valves. The apparatus also includes a rotating field member provided with an exciting winding preferably connected to a source of relatively high frequency alternating current, although low frequency alternating current may be employed under certain operating conditions. The magnetic core member and the inducing member are mounted for relative rotation at a speed dependent upon the frequency which it is desired to supply to the load circuit. For example, if the load comprises an alternating current motor, the magnetic core member may be a stationary member and the inducing member may be a rotating member driven directly from the main alternating current motor. There is also provision for adjusting the phase of the stationary member to control the energization of the load circuit.

Figure 2:
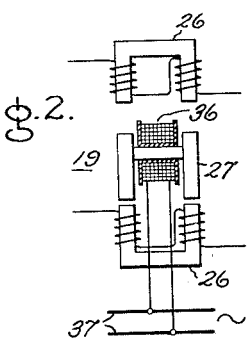
Figure 3:
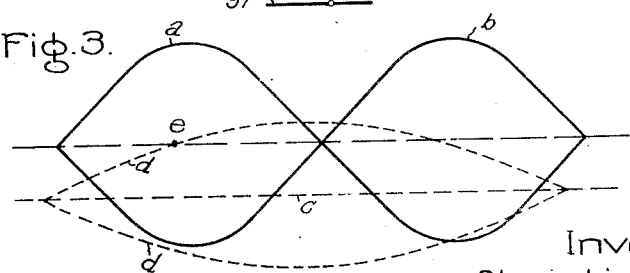

For a better understanding of my invention, together with other and further objects thereof, reference is had to the following description taken in connection with the accompanying drawing and its scope will be pointed out in the appended claims. In the drawing, Fig. 1 illustrates an electric valve converting system for energizing an alternating current motor and provided with an improved grid excitation apparatus embodying my invention; Fig. 2 is a detail of the grid excitation apparatus shown in Fig. 1, while Fig. 3 represents certain operating characteristics of the arrangement of Fig. 1 to aid in the understanding of the invention.

Referring now more particularly to Fig. 1 of the drawing, there is illustrated an electric valve converting system embodying my invention for operating at variable speed a polyphase alternating current motor 10 from a single phase alternating current supply circuit 11. The motor 10 comprises field windings 12, which may preferably be rotatable, and armature phase windings 20-25, inc., which are energized from the alternating current circuit 11 through secondary windings 30-35, inc., respectively, of a transformer 13 provided with a primary winding 14 connected to the circuit 11. The several transformer windings 30–35, inc., supply unidirectional current to their associated phase windings of the motor 10 through the several anodes 15 of a vapor electric discharge device 16, each of the secondary windings 30–35, inc., and its associated armature winding of the motor 10 being connected in a conventional manner to provide full wave rectification. The unidirectional current circuits of these rectifiers form a common connection from the cathode of the discharge device 16 to the field windings 12 of the motor 10 through collector rings 17 and to the common electrical neutral of the armature windings 20–25, inc. It will be understood also, that in place of a multiple anode, single cathode, vapor electric discharge device 16, a plurality of single anode, single cathode devices may be utilized, if desired.

In order to transfer the rectified current between the several armature windings 20–25, inc., of the motor 10 and thus produce a rotating magnetomotive force for producing rotation of the motor, the several anodes 15 of the discharge device 16 are provided with associated control grids 18 which are energized from a grid excitation device 19. The grid excitation device 19 comprises a magnetic core member 26 provided with a plurality of salient poles, one for each of the armature phase windings of the motor 10, and a single salient pole field member 27. The members 26 and 27 are adapted to be rotated relative to each other at a speed corresponding to that of the motor, as for example, by constituting the magnetic member 26 a stationary member, or stator, and connecting the field member 27 directly to the shaft of the motor. The stator member 26 is preferably provided with a phase adjusting mechanism 28. The several poles of the magnetic member 26 are provided with induced windings 40–45, inc., which are connected to excite the grids of the anodes associated with the transformer windings 30–35, inc., respectively. As illustrated, the terminals of these windings are connected to the grids while each of the windings is provided with an electrical midpoint connected to a common neutral which is connected to the cathode of the vapor electric discharge device 16 through a negative bias battery 29.

A detail of the preferred form of the grid excitation apparatus 19 is shown in Fig. 2, which indicates that the cross section of the salient poles of the core member 26 are substantially U-shaped, as is also the cross section of the rotatable field member 27. The rotatable field member 27 may be excited with alternating current of any frequency, according to the operating conditions of the apparatus of which it forms a part. However, I prefer to excite the magnetic member 27 with alternating current of relatively high frequency of the order of magnitude of several hundred cycles. To this purpose the member 27 is provided with a field of exciting coil 36 connected to a relatively high frequency alternating current supply circuit 37.

The general principles of operation of the above described apparatus will be well understood by those skilled in the art. In brief, if the grids 18 of the anodes 15 associated with one of the transformer secondary windings, for example the winding 35, are excited, this winding together with its associated anodes acts as a full wave rectifier to supply unidirectional current to the motor armature phase winding 25 and motor field windings 12. The field produced by the armature phase winding 25 produces a torque on the rotatable field members 12 of the motor 10 causing it to rotate. As it moves through substantially 60 electrical degrees the current is transformed from the phase winding 25 to phase winding 20, as will be explained in more detail hereinafter, to advance the resultant magnetomotive force of the motor 10 so that the rotatable field windings 12 are again in torque producing position. In this manner the current is successively commutated or transferred between the several armature phase windings producing a rotating magnetomotive force, which, in turn, produces a rotation of the field member of the motor 10, the relations being such that at any particular instant only that armature phase winding is energized which is in a torque producing position with respect to the field.

A better understanding of the operation of the grid excitation apparatus 19 to effect the commutation of current between the several phase windings of the motor 10 may be had by reference to Fig. 3. In this figure the curves $a$ and $b$ represent the potentials of the anodes associated with one of the secondary transformer windings; for example, the transformer winding 35. The dotted line $c$ represents the negative bias impressed upon all of the grids through the common negative bias battery 29, while the dotted curves $d$ represent the envelope of the relatively high frequency alternating potentials impressed upon the grids of the anodes associated with the winding 35. Thus, it is seen that at the instant $e$ the anode represented by the curve $a$ will become conductive, and the winding 35 will supply unidirectional current to the armature winding 25 during the remaining portion of that particular half cycle of alternating current and the complete following half cycle of alternating current. At or about this time, the rotating magnetic member 27 will have advanced to a position such that the potential induced in the winding 45 is insufficient to overcome the negative bias of the battery 29, while that induced in the winding 40 will overcome the negative bias of the battery 29 to render conductive the anodes associated with the winding 30 to supply unidirectional current to the motor armature winding 20, thus advancing the magnetomotive force, as explained above. By adjusting the mechanism 28, the phase of the alternating potentials impressed upon the grids 18 may be adjusted with respect to the space phase of the armature windings of the motor 10 to regulate the speed of the motor 10 in a manner similar to the shifting of the brushes of a direct current motor.

As stated above, the alternating current circuit 37 preferably supplies a relatively high frequency alternating current to the exciting winding 36. Under certain circumstances lower frequency alternating current will be satisfactory, in which case the winding 36 may be energized directly from the alternating current supply circuit 11.

While I have illustrated and described my invention as applied to an arrangement for transmitting energy from a single-phase alternating current supply circuit to a six-phase variable speed alternating current motor, it will be obvious to those skilled in the art that it is equally applicable to the transmission of energy from a supply circuit of any number of phases to a motor of any number of phases, or to an alternating current load circuit of any number of phases, in which case the motor 10 may be replaced by an auxiliary pilot synchronous motor and the several windings 20-25, inc., may constitute the primary windings of an output transformer.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a grid-controlled electric valve converting apparatus for transmitting energy from a source of current to an alternating current load circuit including an electric motor, apparatus for exciting the grids of the valves of the converting apparatus in a predetermined sequence, a stator member provided with a plurality of grid excitation windings and a rotating field member arranged to be driven by said motor, and an alternating current circuit connected to excite said field member.

2. In a grid-controlled electric valve converting apparatus for transmitting energy from a source of current to a relatively low frequency alternating current load circuit, apparatus for exciting the grids of the valves of the converting apparatus in a predetermined sequence comprising a magnetic core member provided with a plurality of induced windings and an inducing winding cooperating therewith, means for relatively rotating said core member and said inducing winding, and a source of relatively high frequency alternating current connected to excite said inducing winding.

3. In a grid-controlled electric valve converting apparatus for transmitting energy from a source of current to a relatively low frequency alternating current load circuit including an electric motor, apparatus for exciting the grids of the valves of the converting apparatus in a predetermined sequence comprising a stator member provided with a plurality of grid excitation windings, a rotating field winding arranged to be driven by said motor, and a relatively high frequency alternating current circuit connected to excite said field winding.

4. In a grid-controlled electric valve converting apparatus for transmitting energy from a source of current to an alternating current load circuit including an electric motor, apparatus for exciting the grids of the valves of the converting apparatus in a predetermined sequence comprising a stator member provided with a plurality of grid excitation windings and a rotating exciting member arranged to be driven by said motor, and means for adjusting the angular position of said stator member about the axis of rotation of said exciting member.

5. In a grid-controlled electric valve converting apparatus for transmitting energy from a source of current to a relatively low frequency alternating current load circuit, apparatus for exciting the grids of the valves of the converting apparatus in a predetermined sequence comprising a stator member provided with a plurality of salient poles each carrying a grid excitation winding, a rotating field winding cooperating therewith, means for rotating said field winding, and a source of relatively high frequency alternating current connected to excite said field winding.

6. In a grid-controlled electric valve converting apparatus for transmitting energy from a source of current to a relatively low frequency alternating current load circuit, apparatus for exciting the grids of the valves of the converting apparatus in a predetermined sequence comprising a stator member provided with a plurality of salient poles each carrying a grid excitation winding, a rotating field winding cooperating therewith and provided with a single salient pole member, means for rotating said field winding, and a source of relatively high frequency alternating current connected to excite said field winding.

7. An electric valve converting system comprising a source of current, a relatively low frequency alternating current load circuit, a plurality of grid-controlled electric valves connected to transmit energy from said source to said load circuit, a magnetic core structure provided with a plurality of induced windings, each connected to the grid of one of said valves, an inducing winding for said core structure, a source of relatively high frequency alternating current connected to excite said inducing winding, and means for producing relative rotation between said core structure and said inducing winding at a speed dependent upon the frequency of the alternating current which it is desired to supply to said load circuit.

8. An electric valve converting system comprising a source of current, a variable speed alternating current motor provided with a plurality of phase windings, a plurality of grid-controlled electric valves connected to transmit energy from said source to said windings, a stator member provided with a plurality of grid excitation windings, a rotating field member driven by said motor, and a source of relatively high frequency alternating current connected to excite said field member.

9. A relatively low frequency periodic current generating system comprising a magnetic core structure provided with a plurality of induced windings, a field member provided with an inducing winding and arranged for rotation synchronously with respect to the low frequency current, and a source of relatively high frequency alternating current connected to excite said inducing winding.

10. A relatively low frequency periodic current generator comprising a stationary salient pole magnetic core structure, the pole members being substantially U-shaped in transverse cross section, a plurality of induced windings mounted on the pole members of said core structure, a rotatable field member comprising a salient pole core member of substantially U-shaped transverse cross section, the branches of the poles of said core members being in alignment, and an inducing winding mounted on said field member designed for excitation from a relatively high frequency alternating current.

CHRISTIAN KRÄMER.